UNITED STATES PATENT OFFICE.

JOSEPH ADOLPHE DESMARTEAU, OF MONTREAL, QUEBEC, CANADA.

TAP-WASHER.

1,370,521.  Specification of Letters Patent.  Patented Mar. 8, 1921.

Application filed May 10, 1920. Serial No. 380,279.

*To all whom it may concern:*

Be it known that I, JOSEPH ADOLPHE DESMARTEAU, a British subject, residing at No. 34½ Ste. Cecile street, in the city of Montreal, in the Province of Quebec, in the Dominion of Canada, have invented certain new and useful Improvements in Tap-Washers; and I do hereby declare that the following is a full, clear, and exact description of the same.

The present invention relates to improvements in tap washers and the main object of this invention is to provide a washer that will fit snugly over the valve seat as well as against the inner edges of said valve seat, thus providing a washer that will be absolutely water-tight.

The present invention will be readily understood from the accompanying drawings which form part of this application, in which:—

Like numerals of reference indicate corresponding parts in each figure.

Referring to the drawings:—

Figure 1:
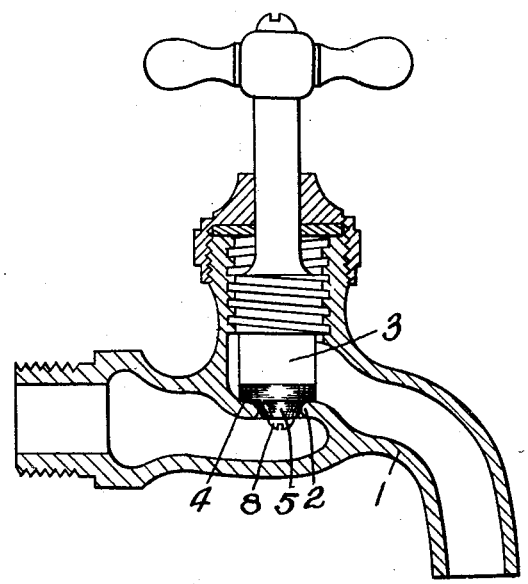
Figure 1 is a vertical sectional view through a tap illustrating a washer according to the invention adapted thereto.
Figure 2:
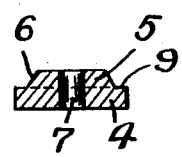
Fig. 2 is an enlarged cross section through the washer.

1 is a tap of the ordinary type and 2 is a valve seat, 3 is the stem of the valve at the bottom of which is secured the washer 4. The washer 4 consists of a circular member of any suitable material having centrally thereof, on one of its sides, a circular projection 5 having oblique converging sides 6, and 7 is a central hole therethrough in which passes the screw 8 to secure the said washer to the valve stem 3.

The flat side of the washer 4 is adapted to rest against the lower end of the valve stem 3, the horizontal flat edge 9 provided between the outward circumference of the washer and the projecting portion 5, forms a seat adapted to rest against the top of the valve seat 2. The projecting tapered circular projection 5 is made to fit snugly between the walls of the opening on the inner side of the valve seat and naturally rests against the inner edge of said valve seat. Thus the washer will contact at two specified points with the valve seat, thereby providing a perfect water tight valve.

It will readily be understood that the oblique converging sides of the projecting portion 5 of the washer could be spherical instead of being straight as illustrated in the drawings, without departing from the spirit and scope of this invention.

What I claim as my invention is:—

A washer for a tap whose valve water passage walls are rounded, comprising a flat upper portion adapted to seat directly upon and in close contact with the portion of the valve seat surrounding the water passage of the valve to close said passage against the flow of water; and a frusto-conical lower portion integral with said flat upper portion, said frusto-conical portion being adapted to pass into and engage the rounded walls of the water passage to further close the water passage against the flow of water and to serve as a guiding means for accurately seating the washer on the valve seat, the upper flat portion of the washer conforming in diameter and shape with the part of the tap spindle with which it engages, the washer having an aperture extending centrally therethrough for the passage of a screw by means of which it is attached to the tap spindle, the lower portion of the frusto-conical portion of the washer conforming in diameter to the diameter of the screw head by means of which it is held to the tap spindle.

Signed at Montreal, Quebec, Canada, this 6th day of April, 1920.

JOSEPH ADOLPHE DESMARTEAU.

Witnesses:
C. PATENAUDE,
M. L. MORSE.